No. 631,016. Patented Aug. 15, 1899.
O. G. KLUGEL.
SHEEP SHEARS.
(Application filed Jan. 30, 1899.)
(No Model.)
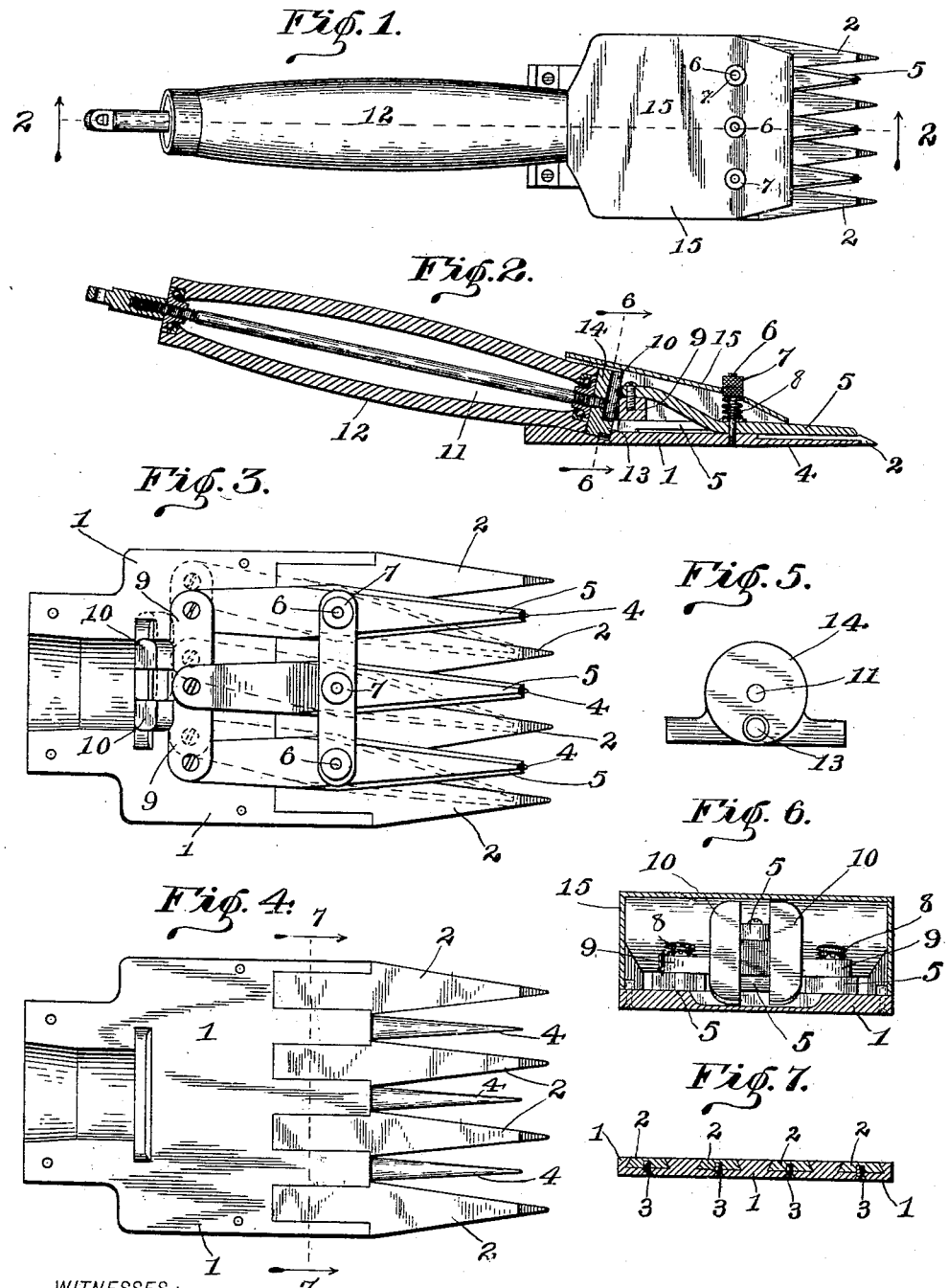
WITNESSES:
C. S. Fry.
J. A. Walsh.
INVENTOR
Oscar G. Klugel,
BY
Chester Bradford,
ATTORNEY.

UNITED STATES PATENT OFFICE.

OSCAR G. KLUGEL, OF INDIANAPOLIS, INDIANA, ASSIGNOR OF ONE-HALF TO JOHN A. KUHN, OF SAME PLACE.

SHEEP-SHEARS.

SPECIFICATION forming part of Letters Patent No. 631,016, dated August 15, 1899.

Application filed January 30, 1899. Serial No. 703,845. (No model.)

*To all whom it may concern:*

Be it known that I, OSCAR G. KLUGEL, a citizen of the United States, residing at Indianapolis, in the county of Marion and State of Indiana, have invented certain new and useful Improvements in Sheep-Shears, of which the following is a specification.

The object of my invention is to produce a sheep-shear capable of being driven by power, and thus secure rapidity, ease, and uniformity of operation.

A sheep-shear embodying my invention will be first fully described and the novel features thereof then pointed out in the claims.

Referring to the accompanying drawings, which are made a part hereof and on which similar numerals of reference indicate similar parts, Figure 1 is a top or plan view of a sheep-shear embodying said invention; Fig. 2, a longitudinal sectional view of the same; Fig. 3, a top or plan view of the shear-head with the cap removed, showing the shear-blades and the mechanism by which they are driven; Fig. 4, a plan view of the base for the blades and mechanism, the latter being removed; Fig. 5, an end elevation of the crank-shaft and crank-wheel by which the blades are driven; Fig. 6, a transverse sectional view of the parts to which the blades are connected and by which they are immediately driven as seen when looking in the direction indicated by the arrows from the dotted line 6 6 in Fig. 2; Fig. 7, a transverse sectional view of the base at the point indicated by the dotted line 7 7 in Fig. 4; and Fig. 8, a cross-section through one of the shear-blades 5, on a large scale, indicating in an exaggerated degree the concavity of its under side.

The base 1 is substantially a plate of metal, and to this are secured the stationary shear-blades 2, which latter may be either formed integrally with the plate or, preferably, seated in dovetail-shaped recesses therein, as best shown in Figs. 4 and 7, in order that they may be removed for purposes of sharpening. In the latter case small screws 3 are preferably employed to secure said blades against removal. Said blades 2 are preferably longer than the cutting-blades, which will be presently described, and have points which project forward and divide the wool prior to the instant of cutting. The plate 1 also preferably has fingers 4 between the shear-blades 2, which fingers are approximately of the same length as the movable shear-blades and are directly beneath the same. These also assist in dividing the wool, and they serve as an efficient means of protecting the skin of the sheep from the moving blades, thus insuring that the skin shall not be cut in the operation of shearing.

The movable shear-blades 5 are mounted on pivots 6, extending up from the plate 1, and are adapted to swing on said pivots back and forth (two positions being indicated by the full and the dotted lines in Fig. 3) and in conjunction with the stationary blades 2 do the required cutting of the wool of the sheep being sheared. These blades are preferably slightly concave on their under sides, (see Fig. 8,) and the pivots 6 extend up somewhat above them and have nuts 7 on their upper ends, between which and the upper surfaces of the blades 5 are springs 8. This insures a true shearing cut and keeps the blades closely together throughout the entire length of the cut, while the rear portion, which has completed the cutting, will separate slightly as the cut approaches the point—that is to say, at the instant of the completion of the cut—when the extreme points of the shearing-blades are cutting. The cutting edges behind said points have been raised slightly apart because of the slightly-concave character of the movable shear-blades and the compressibility of the springs 8, which permit them to rise as the points are forced upwardly as they pass on top of the stationary blades. The force with which the shear-blades are pressed together by the spring is regulated by adjusting the nuts 7. Three of these pivoted or movable shear-blades are shown, and they are connected together by a cross-bar 9, and on this cross-bar are transverse bearing-blocks 10, between which the wrist of the crank runs. These bearing-blocks are rigidly secured to the bar 9 and are preferably formed integrally therewith.

The shaft 11 is mounted in bearings in the handle 12 of the implement and has upon its inner end a wrist-pin 13, which extends between the jaws 10, and by reason of its engagement therewith is adapted to propel the shear-blades 5. I prefer to use a disk 14 as the immediate means of carrying the wrist-pin 13, which disk is secured directly to the end of the shaft. Said shaft should be mounted in roller-bearings, as shown, which bearings are carried within the handle and being of an ordinary and well-known construction need not be further described herein. At the outer end the shaft 11 is provided with means of attachment to such suitable driving power (not shown) as may be employed.

The working parts are covered by a cap-plate 15, so that the wool cannot become entangled therein, but which is easily removable when desired. The pivots 6 and the nuts 7 thereon project up through holes in this cap for convenience in adjusting the same.

This implement is used by being grasped in the hand and run along the skin of the sheep, while the shaft is revolved rapidly by the power by which it is driven, and the wool is clipped evenly, cleanly, and with great rapidity.

Having thus fully described my said invention, what I claim as new, and desire to secure by Letters Patent, is—

1. The combination, in a sheep-shear, of a base having stationary shear-blades terminating in dividing-points extending beyond the pivoted shear-blades, the guards or dividing-fingers located between said stationary shear-blades and of a length corresponding to the pivoted shear-blades, said pivoted shear-blades mounted on pivots secured in the base at an intermediate point and pivoted to a cross-bar at their rear ends, a vertical way for a crank-pin on the rear side of said cross-bar, and the crank-wheel, with pin mounted in said way, on the driving-shaft journaled in the handle, substantially as set forth.

2. The combination, in a sheep-shear, of the base, the stationary cutting-blades, the pivoted cutting-blades formed concave on their under sides and mounted on pivots above said stationary cutting-blades and held toward the same by springs under adjustable nuts, whereby their tension may be varied, the cross-bar connecting the rear ends of said pivoted blades, the crank connected with said bar, and the operating-shaft journaled in the handle, all substantially as described and for the purposes specified.

3. The combination, in a sheep-shear, of the base, stationary shear-blades projecting from said base, fingers arranged between said blades, a series of movable shear-blades pivoted to said base-plate, springs adjacent to the pivots whereby they are elastically held in contact with the stationary blades, a cross-bar by which said several movable blades are united, jaws carried by said bar, and a crank-shaft the wrist whereof projects between said jaws and propels the blades, substantially as set forth.

In witness whereof I have hereunto set my hand and seal, at Indianapolis, Indiana, this 27th day of January, A. D. 1899.

OSCAR G. KLUGEL. [L. S.]

Witnesses:
CHESTER BRADFORD,
JAMES A. WALSH.